US008119719B2

(12) United States Patent
Park et al.

(10) Patent No.: US 8,119,719 B2
(45) Date of Patent: Feb. 21, 2012

(54) INTERMEDIATE TRANSFER BELT AND MANUFACTURING METHOD THEREOF

(75) Inventors: Hyo Jun Park, Yongin-si (KR); Chae Hyun Lim, Yongin-si (KR); Chung Seock Kang, Yongin-si (KR); Sang Min Song, Yongin-si (KR)

(73) Assignee: Kolon Industries, Inc., Gyeonggi-Do (KR)

( * ) Notice: Subject to any disclaimer, the term of this patent is extended or adjusted under 35 U.S.C. 154(b) by 455 days.

(21) Appl. No.: 12/159,653

(22) PCT Filed: Jan. 3, 2007

(86) PCT No.: PCT/KR2007/000018

§ 371 (c)(1), (2), (4) Date: Jun. 30, 2008

(87) PCT Pub. No.: WO2007/078140

PCT Pub. Date: Jul. 12, 2007

(65) Prior Publication Data

US 2009/0054576 A1 Feb. 26, 2009

(30) Foreign Application Priority Data

Jan. 3, 2006 (KR) ........................ 10-2006-0000320
Oct. 16, 2006 (KR) ........................ 10-2006-0100286

(51) Int. Cl.
*C08G 73/10* (2006.01)
*C08L 83/00* (2006.01)

(52) U.S. Cl. ........ 524/432; 524/588; 524/404; 524/405; 524/413; 524/425; 524/428; 524/430; 524/433; 524/442; 524/449; 524/496; 528/26; 528/28; 264/331.19; 977/751; 977/752

(58) Field of Classification Search .................. 524/432, 524/404, 405, 413, 425, 428, 430, 433, 442, 524/449, 496, 588; 528/26, 28; 264/331.19; 977/751, 752
See application file for complete search history.

(56) References Cited

U.S. PATENT DOCUMENTS

| | | | | |
|---|---|---|---|---|
| 5,252,534 | A * | 10/1993 | DePalma et al. | 503/227 |
| 6,007,918 | A * | 12/1999 | Tan et al. | 428/451 |
| 6,818,290 | B1 * | 11/2004 | Chopra et al. | 428/328 |
| 2003/0049056 | A1 * | 3/2003 | Finn et al. | 399/333 |
| 2005/0025984 | A1 * | 2/2005 | Odell et al. | 428/447 |

FOREIGN PATENT DOCUMENTS

| | | |
|---|---|---|
| KR | 10-1994-0009420 B1 | 10/1994 |
| KR | 10-2002-0090891 | 12/2002 |
| KR | 10-2004-0038717 | 5/2004 |

* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

Disclosed are an intermediate transfer belt for use in a laser printer, a fax machine and a copier, and a production method thereof. Specifically, an intermediate transfer belt including silicone modified polyimide resin and a production method thereof are provided, thereby realizing a monolayer intermediate transfer belt having excellent electrical properties, water repellency and heat dissipation properties and good mechanical strength. Further, even without the additional use of an adhesive layer for adhesion to a fluorine resin layer and fluorine resin, the intermediate transfer belt can exhibit satisfactory properties, and process efficiency can be maximized.

15 Claims, No Drawings

INTERMEDIATE TRANSFER BELT AND MANUFACTURING METHOD THEREOF

This is a National Stage application under 35 U.S.C. §371 of PCT/KR2007/000018 filed on Jan. 3, 2007, which claim priority from Korean Patent Application No. 10-2006-0000320 filed on Jan. 3, 2006, and Korean Patent Application No. 10-2006-0100286 filed on Oct. 16, 2006, all of which are incorporated herein by reference.

TECHNICAL FIELD

The present invention relates, in general, to an intermediate transfer belt for use in a laser printer, a fax machine, and a copier, and a production method thereof, and, more particularly, to an intermediate transfer belt, which is produced from silicone modified polyimide resin, and to a method of producing the same.

BACKGROUND ART

Generally, an intermediate transfer belt useful for a laser printer, a fax machine, and a copier should have excellent properties of heat dissipation, water repellency, oil repellency, contamination resistance, heat resistance, elastic modulus, releasability from paper, antistatic properties, and durability.

Further, upon long operation of the above apparatus, due to frictional heat caused between the intermediate transfer belt and the supplied paper in the printing process, considerable heat is generated at the interface therebetween, and thus heat dissipation properties for efficiently dissipating heat, which are regarded as important, are required. However, in the case where such heat dissipation properties are insufficient, the transfer belt becomes deformed due to frictional heat caused by long operation, thereby resulting in unreliable products. Moreover, high-temperature residual heat, which does not dissipate but remains in a small space, negatively affects peripheral devices, undesirably decreasing the lifetime of the peripheral devices and incurring the breakdown thereof.

In addition, the intermediate transfer belt should have volume resistivity suitable for realizing a toner transfer function. If the transfer belt has volume resistivity lower or higher than required, antistatic properties, transfer properties, imaging properties, releasability, contamination resistance and so on are deteriorated, and thus fatal defects, such as poor images, may occur.

Mainly used in a conventional intermediate transfer belt, a polyimide film has high heat stability and superior mechanical and electrical properties, but is very sensitive to moisture, undesirably reducing reliability with respect to electrical insulating properties over time. Also, since the polyimide film has a high glass transition temperature, processability thereof is limited and it easily becomes electrically charged. Further, the volume resistivity thereof is higher than the requirement for the intermediate transfer belt, hence it is difficult to use in the intermediate transfer belt.

In this regard, Japanese Unexamined Patent Publication Nos. 2003-270967, 2002-218339, and 2004-255828 disclose a method of producing a transfer belt, in which a polyamic acid solution, as a precursor of polyimide, is polymerized, placed in a mold, heat treated, further coated with a fluorine polymer compound for increasing releasability from paper, water repellency and oil repellency, and then heat treated.

However, the above method has many temporal, economical and physicochemical problems when actually used, attributable to the complicated process for additionally coating the partially cured polyamic acid solution with the fluorine polymer compound, the choice of a primer useful for adhesion between the polyimide layer, used as a substrate of the intermediate transfer belt, and the fluorine polymer layer, and stripping problems based on poor adhesion therebetween. Further, since a three-layer structure consisting of the polyimide layer, the primer layer, and the fluorine polymer compound layer is provided, the process becomes inefficient and complicated. That is, the thickness of the spray coated primer and fluorine polymer compound may not be uniform depending on working conditions and other factors, and as well, working efficiency is decreased because the process must be repeated several times.

Meanwhile, since the intermediate transfer belt of the laser printer, the fax machine and the copier plays a role in transferring the toner, it must be produced so as to be seamless. When a seamless intermediate transfer belt is produced in a conventional manner, a wash tub process, which realizes fast rotation using centrifugal molding, has been utilized. However, such a process suffers because it is difficult to use to produce a seamless intermediate transfer belt.

DISCLOSURE

Leading to the present invention, intensive and extensive research into the production of an intermediate transfer belt in the form of a monolayer seamless tube, having excellent heat dissipation properties, antistatic properties, water repellency, oil repellency, economic benefits, and transfer properties, carried out by the present inventors, aiming to avoid the problems encountered in the related art, such as processing inefficiency of conventional polyimide-based tubular belts used as the intermediate transfer belt of laser printers, fax machines and copiers, resulted in the development of an intermediate transfer belt in the form of a seamless tube, which can efficiently dissipate heat generated upon extended use in a small space and can exhibit superior water repellency, oil repellency, antistatic properties, and releasability from paper.

SUMMARY OF THE INVENTION

Accordingly, an object of the present invention is to provide an intermediate transfer belt, which is produced from polyimide resin and has improved water repellency.

Another object of the present invention is to provide a monolayer intermediate transfer belt, which is produced from polyimide resin and exhibits excellent heat dissipation properties.

A further object of the present invention is to provide a method of producing an intermediate transfer belt having improved water repellency.

Yet another object of the present invention is to provide a method of producing an intermediate transfer belt having excellent heat dissipation properties in the form of a monolayer seamless tube using polyimide resin.

In order to accomplish the above objects, the present invention provides an intermediate transfer belt, comprising silicone modified polyimide resin.

The intermediate transfer belt may further comprise a thermally conductive filler having thermal conductivity of 20 W/mK or more and electrical resistivity of $10^1$ Ωcm or more.

The thermally conductive filler may be a spherical filler having a particle size of 0.2~20 μm, the spherical filler comprising first particles having a relatively large size of 5~20 μm and second particles having a relatively small size of 0.2~5 μm mixed at a ratio of 6~7:4~3.

The thermally conductive filler may be contained in an amount of 0.01~30 wt %, based on the total amount of a solute.

The thermally conductive filler may comprise one, or mixtures of two or more, selected from the group consisting of single-walled carbon nanotubes, multi-walled carbon nanotubes, silica, alumina, aluminum borate, silicon carbide, titanium carbide, boron carbide, silicon nitride, boron nitride, aluminum nitride, titanium nitride, mica, potassium titanate, beryllium titanate, calcium carbonate, magnesium oxide, zirconium oxide, tin oxide, beryllium oxide, aluminum oxide, and aluminum hydroxide.

The intermediate transfer belt may have thermal conductivity of 5.1~7.4 W/mK.

The intermediate transfer belt may further comprise an electrically conductive filler.

The intermediate transfer belt may have volume resistivity of $10^8$~$10^{13}$ Ωcm, a contact angle of 105~113°, and an elastic modulus of 0.8~4.5 GPa.

The silicone modified polyimide resin may be a copolymer comprising dianhydride, diamine and silicone resin.

The silicone resin may have a number average molecular weight from 600 to 2,000, and may be contained in an amount of 10~30 wt %, based on the amount of the diamine.

The silicone resin may comprise one, or mixtures of two or more, selected from the group consisting of polydimethylsiloxane, polydiphenylsiloxane, and polymethylphenylsiloxane as a copolymer thereof.

In addition, the present invention provides a method of producing an intermediate transfer belt, comprising dissolving dianhydride, diamine, and silicone resin in a highly polar aprotic solvent, thus preparing a silicone modified polyamic acid solution; and loading the silicone modified polyamic acid solution into a mold and then heat treating it to induce imidation.

When preparing the silicone modified polyamic acid solution, a thermally conductive filler having thermal conductivity of 20 W/mK or more and electrical resistivity of $10^1$ Ωcm or more may be further comprised.

The mold may be a cylindrical mold having a double structure composed of an outer cylinder and an inner cylinder.

When preparing the silicone modified polyamic acid solution, an electrically conductive filler may be further comprised.

The heat treating to induce the imidation may be performed at 60~400° C.

DETAILED DESCRIPTION OF THE INVENTION

Hereinafter, a detailed description will be given of the present invention.

Used in the intermediate transfer belt of the present invention, polyimide resin comprises silicone modified polyimide resin copolymerized with silicone resin.

The silicone modified polyimide resin is obtained by dissolving dianhydride, diamine, and silicone resin in a highly polar aprotic solvent to prepare a silicone modified polyamic acid solution, which is then heat treated to induce imidation.

The dianhydride and diamine used in the preparation of the silicone modified polyimide resin are not particularly limited, as long as they are typically used in the preparation of polyimide resin. Examples of the diamine include 1,4-phenylenediamine (1,4-PDA), 1,3-phenylenediamine (1,3-PDA), 4,4'-methylenedianiline (MDA), 4,4'-oxydianiline (ODA), 4,4'-oxyphenylenediamine (OPDA), etc., and examples of the dianhydride include 1,2,4,5-benzenetetracarboxylic dianhydride (PMDA), 3,3',4,4'-biphenyltetracarboxylic dianhydride (BTDA), 4,4'-oxydiphthalic anhydride (ODPA), 4,4'-hexafluoroisopropylidenediphthalic anhydride, etc. As such, the diamine and the dianhydride are used in an equimolar ratio.

The silicone resin, having both organic properties and inorganic properties, is used to impart contamination resistance, water repellency, oil repellency, and releasability from paper, and comprises one or more selected from among polydimethylsiloxane, polydiphenylsiloxane, and polymethylphenylsiloxane as a copolymer thereof. This resin has a number average molecular weight ranging from 600 to 2,000, in order to minimize micro-phase separation upon the polymerization of polyimide. The silicone resin is preferably used in an amount of 10~30 wt %, based on the amount of the diamine.

The silicone resin of the present invention, which has a repeating Si—O bond of Si and O atoms as a main chain thereof, is preferably exemplified by polydimethylsiloxane, in which two methyl groups, as a bulky organic substituent, are attached to an Si atom, and polydiphenylsiloxane, in which two phenyl groups are attached thereto. In the field of the silicone industry, particularly useful is polydimethylsiloxane, having a glass transition temperature of −123° C., which is the lowest temperature among elastomers known to date. Further, polydiphenylsiloxane is known to have a higher glass transition temperature than that of polydimethylsiloxane, and to exhibit superior heat stability and mechanical properties. Due to nonpolar properties and low surface energy thereof, in the polymer compound modified with siloxane, the siloxane component is separated from the polymer, and thus moves at the interface between air and the polymer. In this way, since the siloxane component comes out of the surface of the polymer, the surface of the polymer can manifest excellent water repellency, oil repellency and releasability. Such properties are also observed in the case of two-phase copolymers and blends. However, in the present invention, the silicone resin is not limited to polydimethylsiloxane and polydiphenylsiloxane.

In the preparation of the silicone modified polyamic acid solution, in the case where the silicone resin is used in an amount less than 10 wt %/based on the amount of diamine, water repellency and oil repellency are not greatly improved, and thus low moisture resistance, which is the disadvantage of polyimide, is not significantly improved. On the other hand, if the amount exceeds 30 wt/, attributable to the effect of the silicone resin, which has flexible properties relative to polyimide, mechanical strength is drastically decreased.

Upon polymerization, a solvent, selected from among highly polar aprotic solvents, such as N,N-dimethylformamide (DMF), dimethylacetamide (DMAc), and N-methyl-2-pyrrolidinone (NMP), may be used.

In consideration of heat dissipation properties, the resultant intermediate transfer belt preferably has thermal conductivity of 5.1~17.4 W/mK. Thus, when the silicone modified polyamic acid solution is prepared, a thermally conductive filler is further included and is allowed to react at 0~30° C. for a time period ranging from 30 min to 12 hours.

In order to prepare a composite material having excellent heat dissipation properties, a process of efficiently packing the thermally conductive filler in the matrix of the composite material should be performed. As such, the packing density of the thermally conductive filler may vary depending on the shape, size and amount thereof. Further, heat transfer, which is the transfer of thermal energy occurring due to temperature difference, is realized in three types, that is, conduction, convection and radiation. Among these types, thermal conductivity increases in proportion to the area in which the transfer phenomenon occurs.

In the case of the composite material, which has heat dissipation properties, heat is transferred by conduction, and the transferred heat value is increased in proportion to the sectional area of the composite material, and is inversely proportional to thickness and is proportional to the temperature difference.

Such a phenomenon may be briefly represented by the following Fourier's heat conduction equation:

$$q=-kA(dT/dX)$$

wherein A is the area of the composite material, T is the temperature, X is the thickness of the composite material, q is the heat value transferred by conduction, and k is the thermal conductivity of the composite material.

Accordingly, it is preferred that the thermally conductive filler have thermal conductivity of 20 W/mK or more.

Further, the thermally conductive filler preferably has electrical resistivity of $10^1$ Ωcm or more. If the electrical resistivity is less than the above value, the transfer belt has very low volume resistivity, and is thus unsuitable therefor.

As the thermally conductive filler, used are a single inorganic filler, or mixtures of two or more, selected from among single-walled carbon nanotubes, multi-walled carbon nanotubes, silica, alumina, aluminum borate, silicon carbide, titanium carbide, boron carbide, silicon nitride, boron nitride, aluminum nitride, titanium nitride, mica, potassium titanate, beryllium titanate, calcium carbonate, magnesium oxide, zirconium oxide, tin oxide, beryllium oxide, aluminum oxide, and aluminum hydroxide.

The shape of the thermally conductive filler is not particularly limited, but may be spherical, acicular, or platy. In the case of the acicular filler, it is not efficiently packed, and thus has a low packing density. Further, in the case of the platy filler, since the thermal conductivity thereof varies depending on its axial orientation, it is difficult to realize a high packing density. Thus, the spherical filler is particularly useful.

The spherical filler has a particle size of 0.2~20 μm, the acicular filler 0.5~5 μm, and the platy filler 0.5~10 μm. In particular, the spherical filler preferably comprises first particles having a relatively large size of 5~20 μm and second particles having a relatively small size of 0.2~5 μm, mixed at a ratio of 6~7:4~3. This is because the filler having a relatively small particle size is efficiently packed in the void space of the filler having a large particle size, thus making it possible to uniformly form a thermally conductive network for dissipating heat.

In the intermediate transfer belt, when the thermally conductive fillers are uniformly dispersed in the belt in a state of maintaining the intrinsic thermal conductivity and the appropriate amount, a heat transfer path able to dissipate heat can be formed.

For efficient heat conduction, the thermally conductive filler is preferably used in an amount of 0.01~30 wt %, based on the total amount of the solute.

In addition to the thermally conductive filler, an electrically conductive filler may be further included in order to control the volume resistivity of the polyimide resin. As the electrically conductive filler, one or more selected from among ketjen black, acetylene black, and furnace black may be used in an amount of 2~35 wt %, based on the total amount of the solute. Also, a metal filler, in which aluminum, nickel, silver or mica is doped (impregnated) with antimony, for example, Dentall TM-200, may be further included, and may be used in an amount of 0.1~5 wt %, based on the total amount of the solute.

The silicone modified polyamic acid solution thus prepared is loaded into the mold and heat treated to induce imidation.

Although the mold is not particularly limited, a cylindrical mold is used to produce a seamless intermediate transfer belt. Particularly useful is a cylindrical Teflon mold having a double structure composed of an outer cylinder and an inner cylinder. Therefore, the thickness of the belt may be controlled using the difference in the diameter between the outer cylinder and the inner cylinder. Preferably, the belt has a thickness of 30~300 μm. With regard to the production of the intermediate transfer belt, in order to improve heat dissipation properties, if the belt is formed too thin, the belt has drastically decreased rigidity and thus may become cracked or warped under the repeated rotation stress in the printing process. With the intention of efficiently dissipating heat necessarily generated when the intermediate transfer belt is operated for a long time period, the thermally conductive fillers should be added into the resin for the belt.

The heat treatment is conducted stepwisely in the temperature range of 50~400° C. That is, prebaking is performed at 50~100° C. for 10~120 min to primarily remove the solvent and moisture from the surface of the belt, and then postcuring is performed at 350~400° C. with a heating rate of 2~10° C./min to completely remove the solvent and moisture from the surface thereof. Thereby, when imidation progresses and is then completed, a transfer belt of a solidified film is obtained.

The transfer belt typically has thermal conductivity of 5.1~7.4 W/mK and medium resistivity of $10^8$~$10^{13}$ Ωcm, consequently realizing a semi-conductive intermediate transfer belt for use in a laser printer, a fax machine, and a copier, having excellent antistatic properties and printability.

The transfer belt preferably has a contact angle of 105~113°. The contact angle indicates a thermodynamic equilibrium angle of contact of a liquid on a solid surface, and is estimated through the profile of a sessile liquid drop on the solid surface. As such, a small contact angle indicates a hydrophilic sample, whereas a large contact angle indicates a hydrophobic sample. In the case of the polyimide-based polymer compound, having a contact angle of 20~70°, water repellency and oil repellency are low, leading to very low moisture resistance. Accordingly, the contact angle should be increased so as to improve moisture resistance.

Further, the transfer belt of the present invention preferably has an elastic modulus of 0.8~4.5 GPa. If the elastic modulus is below the lower limit, mechanical deformation is caused upon extended use of the intermediate transfer belt. On the other hand, if the elastic modulus is above the upper limit, mechanical strength is decreased.

A better understanding of the present invention may be obtained through the following examples, which are set forth to illustrate, but are not to be construed as the limit of the present invention.

Example 1

While nitrogen was introduced into a four-neck flask equipped with a mechanical stirrer, a reflux condenser, and a nitrogen inlet, 47 g of PMDA and 43 g of 4,4-oxydianiline were dissolved in 380 g of a highly polar aprotic solvent, DMF, after which polydimethylsiloxane, having a number average molecular weight of 600 and containing aminopropyl groups at both terminal ends thereof, was added in an amount of 10 wt % based on the weight of 4,4-oxydianiline to thus prepare a complete solution. Then, as electrically conductive filler, 2 wt % of ketjen black, and 0.5 wt % of Dentall TM-200, based on the total weight of the solute, were dispersed in the above solution using an ultrasonic distributor and then allowed to react at room temperature for 1 hour, thus preparing an electrically conductive filler-containing polydimethylsiloxane modified polyamic acid solution.

The polydimethylsiloxane modified polyamic acid solution thus prepared was loaded into a cylindrical Teflon mold having a double structure composed of an outer cylinder and an inner cylinder, and then prebaked at 70° C. for 1 hour to primarily remove the solvent and moisture from the surface of the belt, after which the inner cylinder was separated from the outer cylinder. Thereafter, a post-curing process was conducted at 350° C. with a heating rate of 5° C./min, to thus completely remove the solvent and moisture from the surface and the inside of the belt.

The resultant polydimethylsiloxane modified polyimide-based intermediate transfer belt had a thickness of 65 μm.

Example 2

A polydimethylsiloxane modified polyimide-based intermediate transfer belt was produced in the same manner as in Example 1, with the exception that Dentall TM-200 was not used as the electrically conductive filler.

Example 3

A polydimethylsiloxane modified polyimide-based intermediate transfer belt was produced in the same manner as in Example 1, with the exception that polydimethylsiloxane was used in an amount of 30 wt % based on the weight of 4,4-oxydianiline.

Example 4

A polydimethylsiloxane modified polyimide-based intermediate transfer belt was produced in the same manner as in Example 1, with the exception that polydimethylsiloxane having a number average molecular weight of 620 and containing aminopropyl groups at both terminal ends thereof was used, spherical alumina ($Al_2O_3$) having thermal conductivity of 105 W/mK and electrical resistivity of $10^2$ Ωcm was used as the thermally conductive filler in an amount of 3 wt % based on the total weight of the solute, the alumina being composed of 6 μm-sized particles and 0.5 μm-sized particles mixed at a ratio of 7:3, and ketjen black was used as the electrically conductive filler in an amount of 1.5 wt % based on the total weight of the solute.

Example 5

A polydimethylsiloxane modified polyimide-based intermediate transfer belt was produced in the same manner as in Example 4, with the exception that alumina was not used as the thermally conductive filler.

Example 6

A polydiphenylsiloxane modified polyimide-based intermediate transfer belt was produced in the same manner as in Example 4, with the exception that polydiphenylsiloxane, having a number average molecular weight of 750 and containing aminopropyl groups at both terminal ends thereof, was used.

Example 7

A polydiphenylsiloxane modified polyimide-based intermediate transfer belt was produced in the same manner as in Example 6, with the exception that alumina, comprising 6 μm-sized particles and 0.5 μm-sized particles mixed at a ratio of 6:4, was used as the thermally conductive filler.

Example 8

A polydiphenylsiloxane modified polyimide-based intermediate transfer belt was produced in the same manner as in Example 6, with the exception that alumina comprising 6 μm-sized particles and 0.5 μm-sized particles, mixed at a ratio of 3:7, was used as the thermally conductive filler.

Example 9

A polydiphenylsiloxane modified polyimide-based intermediate transfer belt was produced in the same manner as in Example 6, with the exception that, as the thermally conductive filler, acicular alumina, having a length of 5 μm, thermal conductivity of 100 W/mK, and electrical resistivity of $10^2$ Ωcm, was used alone in an amount of 3 wt %.

Example 10

A polydiphenylsiloxane modified polyimide-based intermediate transfer belt was produced in the same manner as in Example 6, with the exception that, as the thermally conductive filler, platy boron nitride, having a length of 5 μm, thermal conductivity of 156 W/mK, and electrical resistivity of $10^2$ Ωcm, was used alone in an amount of 3 wt %.

Example 11

A polydiphenylsiloxane modified polyimide-based intermediate transfer belt was produced in the same manner as in Example 6, with the exception that, as the thermally conductive filler, alumina comprising 6 μm-sized particles and 0.5 μm-sized particles mixed at a ratio of 7:3 was used in an amount of 1.5 wt %, based on the total weight of the solute.

Example 12

A polydiphenylsiloxane modified polyimide-based intermediate transfer belt was produced in the same manner as in Example 6, with the exception that, as the thermally conductive filler, alumina, comprising 6 μm-sized particles and 0.5 μm-sized particles mixed at a ratio of 7:3, was used in an amount of 0.01 wt %, based on the total weight of the solute.

Example 13

A polydiphenylsiloxane modified polyimide-based intermediate transfer belt was produced in the same manner as in Example 6, with the exception that ketjen black was not used as the electrically conductive filler.

Example 14

A polydiphenylsiloxane modified polyimide-based intermediate transfer belt was produced in the same manner as in Example 6, with the exception that acicular mica, having a length of 5 μm, thermal conductivity of 20 W/mK, and electrical resistivity of $10^1$ Ωcm was used, instead of alumina.

Example 15

A polydiphenylsiloxane modified polyimide-based intermediate transfer belt was produced in the same manner as in Example 6, with the exception that the polydiphenylsiloxane was used in an amount of 5 wt % based on the weight of 4,4-oxydianiline.

Example 16

A polydiphenylsiloxane modified polyimide-based intermediate transfer belt was produced in the same manner as in Example 6, with the exception that the polydiphenylsiloxane was used in an amount of 35 wt % based on the weight of 4,4-oxydianiline.

Example 17

A polydiphenylsiloxane modified polyimide-based intermediate transfer belt was produced in the same manner as in Example 6, with the exception that the thermally conductive filler, alumina, was used in an amount of 36 wt %.

Example 18

A polydiphenylsiloxane modified polyimide-based intermediate transfer belt was produced in the same manner as in Example 6, with the exception that ketjen black, having thermal conductivity of 75 W/mK and electrical resistivity of $10^0$ Ωcm, was used instead of alumina.

Example 19

A polydiphenylsiloxane modified polyimide-based intermediate transfer belt was produced in the same manner as in Example 6, with the exception that molybdenum powder, having thermal conductivity of 12 W/mK and electrical resistivity of $10^1$ Ωcm, was used instead of alumina.

Comparative Example 1

A polyimide-based intermediate transfer belt was produced in the same manner as in Example 1, with the exception that polydimethylsiloxane was not used.

Comparative Example 2

A polyimide-based intermediate transfer belt was produced in the same manner as in Comparative Example 1, coated with a primer, which was a silicone component, using a spraying process, and then spray coated three times with polydimethylsiloxane, containing 2 wt % of ketjen black and 0.5 wt % of Dentall TM-200. Finally, the spray coated sample was cured at 350° C. or less for 10~60 min, thereby producing a silicone modified polyimide-based intermediate transfer belt having a three-layer structure consisting of polyimide, primer and polydimethylsiloxane.

Comparative Example 3

A polyimide-based intermediate transfer belt was produced in the same manner as in Example 6, with the exception that polydiphenylsiloxane was not used.

Comparative Example 4

A polyimide-based intermediate transfer belt was produced in the same manner as in Comparative Example 3, coated with a primer, which was a silicone component, using a spraying process, and then spray coated three times with polydimethylsiloxane containing 2 wt % of ketjen black and 0.5 wt % of Dentall TM-200. Finally, the spray coated sample was cured at 350° C. or less for 10~60 min, thereby producing a silicone modified polyimide-based intermediate transfer belt having a three-layer structure consisting of polyimide, primer and polydimethylsiloxane.

The properties of the intermediate transfer belts produced in the examples and comparative examples were measured according to the following procedures. The results are given in Table 1 below.

(1) Thermal Conductivity

Thermal conductivity was measured using an FL5000 thermal conductivity analyzer according to ASTM E1461, based on polyethylene foam, silicone rubber, quartz glass, zirconia.

(2) Volume Resistivity

Voltage was continuously applied to the sample and measured using a resistivity tester, available from Mitsubishi Chemical. As such, while the magnitude of voltage applied to the sample was changed to 10 V, 100 V, 250 V, 500 V, and 1000 V, measurement was performed. Further, volume resistivity was measured in such a manner that the sample was mounted on a metal substrate and then measured for the resistivity at intervals of 10~30 sec. As such, a ring-shaped probe was used.

(3) Contact Angle

The contact angle of the silicone modified polyimide-based intermediate transfer belt was measured to determine water repellency and oil repellency thereof. To this end, a dynamic contact angle meter, DCA 3115, available from CAHN, was used at 25° C. A solution of deionized water and 6 μl of ethyleneglycol was dropped on the surface of the sample in the form of a sessile drop, after which the contact angle was estimated through a monitor for magnifying the interface between the surface of the sample and the drop of the solution. 10 Measurements were continuously performed and the values thereof were averaged.

(4) Elastic Modulus

The elastic modulus of the silicone modified polyimide-based intermediate transfer belt was measured using a universal testing machine, Model 1000, available from Instron, according to JIS K 6301.

TABLE 1

| No. | Thermal Conductivity (W/mK) | Volume Resistivity (Ωcm) | Contact Angle (°) | Elastic Modulus (GPa) |
|---|---|---|---|---|
| Ex. 1 | 3.25 | $1.53 \times 10^{8}$ | 107 | 1.29 |
| Ex. 2 | 2.92 | $3.57 \times 10^{10}$ | 105 | 1.27 |
| Ex. 3 | 3.22 | $8.19 \times 10^{13}$ | 113 | 0.97 |
| Ex. 4 | 6.95 | $3.24 \times 10^{10}$ | 108 | 2.60 |
| Ex. 5 | 3.01 | $8.07 \times 10^{11}$ | 106 | 3.00 |
| Ex. 6 | 7.33 | $3.53 \times 10^{10}$ | 109 | 3.30 |
| Ex. 7 | 6.92 | $3.07 \times 10^{10}$ | 111 | 3.15 |
| Ex. 8 | 6.27 | $1.11 \times 10^{10}$ | 105 | 3.07 |
| Ex. 9 | 5.10 | $2.32 \times 10^{10}$ | 105 | 3.03 |
| Ex. 10 | 6.31 | $1.21 \times 10^{10}$ | 112 | 3.05 |
| Ex. 11 | 5.95 | $3.23 \times 10^{10}$ | 107 | 3.02 |
| Ex. 12 | 5.27 | $1.22 \times 10^{10}$ | 108 | 3.02 |
| Ex. 13 | 7.01 | $7.08 \times 10^{16}$ | 110 | 3.13 |
| Ex. 14 | 5.33 | $5.22 \times 10^{10}$ | 107 | 3.01 |
| Ex. 15 | 7.00 | $4.11 \times 10^{10}$ | 103 | 3.31 |
| Ex. 16 | 7.35 | $3.46 \times 10^{10}$ | 114 | 2.10 |
| Ex. 17 | 8.33 | $7.53 \times 10^{5}$ | 112 | 3.50 |
| Ex. 18 | 6.75 | $2.56 \times 10^{4}$ | 107 | 2.95 |
| Ex. 19 | 4.53 | $5.75 \times 10^{10}$ | 106 | 3.00 |
| C. Ex. 1 | 2.86 | $2.3 \times 10^{10}$ | 46 | 1.28 |
| C. Ex. 2 | 3.39 | $5.7 \times 10^{10}$ | 105 | 0.86 |
| C. Ex. 3 | 7.09 | $1.58 \times 10^{10}$ | 67 | 2.80 |
| C. Ex. 4 | 4.31 | $6.13 \times 10^{10}$ | 103 | 0.95 |

As the results of measurement of the properties, when silicone was added to the main chain of the polyimide in an amount not less than 10 wt % based on the amount of diamine, the contact angle of the copolymerized silicone modified polyimide-based intermediate transfer belt was increased to around 105° or more. That is, the hydrophobic properties could be imparted through the modification of silicone, and thus low moisture resistance, which is the disadvantage of polyimide, was increased, and furthermore, releasability from the supplied paper was high. However, in Comparative Examples 1 and 3, which were not modified with silicone, although the volume resistivity was suitable for use in the intermediate transfer belt, the contact angles were 46° and 67°, respectively. From this, low moisture resistance could be seen never to improve. In the case of Example 15, in which the silicone resin was added in a small amount, the contact angle was 103°, whereby low moisture resistance could be seen never to show the desired improvement. In Comparative Examples 2 and 4, the contact angle was slightly improved, but the process efficiency was decreased because the process was repeated several times due to the three-layer structure, compared to the examples in which the silicone compound was chemically introduced into the main chain of the polyimide. As well, the elastic modulus was decreased and thus the intermediate transfer belt raised concerns about mechanical deformation thereof upon extended use.

In the examples of the present invention in which the silicone resin was introduced, electrical properties, moisture resistance, and mechanical strength were all exhibited as desired. In the case where the thermally conductive filler was additionally included, thermal conductivity was further increased. In Example 17, in which an excess of the thermally conductive filler was added, thermal conductivity was too high and the volume resistivity was drastically decreased, therefore making it difficult to realize the image of the toner on a color laser printer.

As the thermally conductive filler, when spherical alumina, comprising 6 μm-sized particles and 0.5 μm-sized particles mixed at a ratio of 7:3 or 6:4, was used, thermal conductivity was the highest.

In Examples 6 and 7 in which alumina having a large particle size was added in a relatively larger amount than alumina having a small particle size, thermal conductivity was superior, compared to in Example 8, in which alumina having a small particle size was added in a relatively larger amount than alumina having a large size. Accordingly, in the case of Examples 6 and 7, alumina packing density was higher than in Example 8.

Comparing Example 6, using spherical alumina, with Example 9, using acicular alumina, and Example 10, using platy boron nitride, even though the fillers were used in the same amount of 3 wt % and had similar thermal conductivity, the heat dissipation properties of the resultant conductive film were better when using spherical alumina. Depending on the shape of alumina used, the acicular alumina was not efficiently packed and thus had a low packing density, leading to a non-uniform thermally conductive network. The platy boron nitride, which had intrinsic thermal conductivity superior to that of spherical alumina, exhibited high heat dissipation properties of 156 W/mK in the a-axis direction but low heat dissipation properties of 2 W/mK in the c-axis direction, because the particle configuration thereof had a platy structure. Therefore, this filler was not highly packed in the matrix structure of the intermediate transfer belt. From these results, it was concluded that relatively higher heat dissipation properties were achieved in the examples in which spherical alumina was used than in cases using acicular or platy alumina.

In the case of Example 18, using the filler having thermal conductivity of 75 W/mK but having electrical resistivity of $10^0$ Ωcm, the volume resistivity was drastically decreased to about $2.56\times10^4$ Ωcm. Further, in the case of Example 19 using the filler having electrical resistivity of $10^1$ Ωcm but having thermal conductivity of 12 W/mK, the thermal conductivity was considerably decreased to about 4.53 W/mK. These cases were considered to be unsuitable for use in the intermediate transfer belt.

In the case where the electrically conductive filler was added, the volume resistivity was exhibited in the range of $10^8$~$10^{13}$ Ωcm, which was regarded as being suitable for use in the intermediate transfer belt of laser printers, fax machines, and copiers. However, in the case of Example 13, in which the electrically conductive filler was not added, the volume resistivity was remarkably increased, and accordingly, antistatic properties, transfer properties, imaging properties, releasability and contamination resistance and so on were deteriorated, resulting in image defects.

INDUSTRIAL APPLICABILITY

As described above, the present invention provides an intermediate transfer belt and a production method thereof. According to the present invention, a monolayer intermediate transfer belt using silicone modified polyimide resin can be provided, thus making it possible to realize an intermediate transfer belt having excellent heat dissipation properties, electrical properties and water repellency, and good mechanical strength.

Further, even though an adhesive layer for adhesion to a fluorine resin layer and fluorine resin is not additionally formed, the intermediate transfer belt can exhibit satisfactory properties. In addition, a method of producing an intermediate transfer belt having excellent heat dissipation properties, electrical properties and water repellency in an efficient manner can be provided, therefore maximizing process efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An intermediate transfer belt, comprising a silicone modified polyimide resin, wherein the silicone modified polyimide resin is a copolymer comprising dianhydride, diamine and silicone resin, and wherein the silicone resin is contained in an amount of 10-30 wt % based on the amount of the diamine; and a thermally conductive filler having thermal conductivity of 20 W/mK or more and electrical resistivity of $10^1$ Ωm or more, the thermally conductive filler being a spherical filler having a particle size of 0.2-20 μm, wherein the spherical filler comprises first particles having a size of 5-20 μm and second particles having a size of 0.2-5 μm mixed at a ratio of 6-7:4-3.

2. The intermediate transfer belt according to claim 1, wherein the thermally conductive filler is contained in an amount of 0.01-30 wt %, based on the total amount of a solute.

3. The intermediate transfer belt according to claim 1, wherein the thermally conductive filler comprises one, or mixtures of two or more, selected from the group consisting of single-walled carbon nanotubes, multi-walled carbon nanotubes, silica, alumina, aluminum borate, silicon carbide, titanium carbide, boron carbide, silicon nitride, boron nitride, aluminum nitride, titanium nitride, mica, potassium titanate, beryllium titanate, calcium carbonate, magnesium oxide, zirconium oxide, tin oxide, beryllium oxide, aluminum oxide, and aluminum hydroxide.

4. The intermediate transfer belt according to claim 1, which has thermal conductivity of 5.1-7.4 W/mK.

5. The intermediate transfer belt according to claim 1, which further comprises an electrically conductive filler.

6. The intermediate transfer belt according to claim 1, which has volume resistivity of $10^8$-$\mathbf{10}^{13}$ Ωcm.

7. The intermediate transfer belt according to claim 1, which has a contact angle of 105-113°.

8. The intermediate transfer belt according to claim 1, which has an elastic modulus of 0.8-4.5 GPa.

9. The intermediate transfer belt according to claim 1, wherein the silicone resin has a number average molecular weight from 600 to 2,000.

10. The intermediate transfer belt according to claim 1, wherein the silicone resin comprises one, or mixtures of two or more, selected from the group consisting of polydimethylsiloxane, polydiphenylsiloxane, and polymethylphenylsiloxane as a copolymer thereof.

11. A method of producing an intermediate transfer belt, comprising: dissolving a dianhydride, a diamine, a silicone resin and a thermally conductive filler in a highly polar aprotic solvent, thus preparing a silicone modified polyamic acid solution; and loading the silicone modified polyamic acid solution into a mold and then heat treating it to induce imidation, wherein the silicone modified polyimide resin is a copolymer comprising dianhydride, diamine and silicone resin, and wherein the silicone resin is contained in an amount of 10-30 wt % based on the amount of the diamine wherein the thermally conductive filler has thermal conductivity of 20 W/mK or more and electrical resistivity of $10^1$ Ωm or more, the thermally conductive filler being a spherical filler having a particle size of 0.2-20 gm, wherein the spherical filler comprises first particles having a size of 5-20 μm and second particles having a size of 0.2-5 μm mixed at a ratio of 6-7:4-3.

12. The method according to claim 11, wherein the mold is a cylindrical mold having a double structure composed of an outer cylinder and an inner cylinder.

13. The method according to claim 11, wherein an electrically conductive filler is further comprised when preparing the silicone modified polyamic acid solution.

14. The method according to claim 11, wherein the heat treating to induce the imidation is performed at 60-400° C.

15. The intermediate transfer belt according to claim 1, which further comprises an electrically conductive filler.

* * * * *